US010147322B2

(12) United States Patent
Strassberger et al.

(10) Patent No.: US 10,147,322 B2
(45) Date of Patent: Dec. 4, 2018

(54) SAFETY-COMPLIANT MULTIPLE OCCUPANCY OF A CHANNEL IN INTELLIGENT TRANSPORTATION SYSTEMS

(71) Applicants: Bayerische Motoren Werke Aktiengesellschaft, Munich (DE); Denso Corporation, Kariya-shi, Aichi (JP)

(72) Inventors: Markus Strassberger, Wartenberg (DE); Tim Leinmueller, Garching (DE)

(73) Assignees: Bayerische Motoren Werke Aktiengesellschaft, Munich (DE); DENSO Corporation, Kariya-shi (JP)

(*) Notice: Subject to any disclaimer, the term of this patent is extended or adjusted under 35 U.S.C. 154(b) by 0 days.

(21) Appl. No.: 15/012,975

(22) Filed: Feb. 2, 2016

(65) Prior Publication Data
US 2016/0155333 A1    Jun. 2, 2016

Related U.S. Application Data

(63) Continuation of application No. PCT/DE2014/100278, filed on Jul. 31, 2014.

(30) Foreign Application Priority Data
Aug. 15, 2013 (DE) .......... 10 2013 013 621

(51) Int. Cl.
*G08G 1/00* (2006.01)
*G08G 1/16* (2006.01)
*B60W 10/00* (2006.01)

(52) U.S. Cl.
CPC ............. *G08G 1/161* (2013.01); *B60W 10/00* (2013.01); *G08G 1/22* (2013.01)

(58) Field of Classification Search
CPC .......... G08G 1/22; G08G 1/161; B60W 10/00
USPC ........................................... 340/902
See application file for complete search history.

(56) References Cited

U.S. PATENT DOCUMENTS 6,337,978 B1* 1/2002 Inoue ................ H04W 52/0245
                                                    455/421
2003/0225485 A1  12/2003 Fritz et al.
(Continued)

FOREIGN PATENT DOCUMENTS

CN          1611386 A      5/2005
CN        101393686 A      3/2009
(Continued)

OTHER PUBLICATIONS

English translation of Chinese Office Action issued in counterpart Chinese Application No. 201480045233.1 dated Sep. 13, 2016 (eleven (11) pages).

(Continued)

*Primary Examiner* — Zhen Y Wu
(74) *Attorney, Agent, or Firm* — Crowell & Moring LLP

(57) ABSTRACT

An efficient implementation of intelligent transportation systems is provided. A control unit for a vehicle is designed to receive and/or to transmit a safety-relevant vehicle cooperation message via a physical channel of a communication unit of the vehicle. The control unit is designed to determine an indication of the vehicle having a reduced risk of conflict with another road user in a first period of time. The control unit is designed to receive and/or to transmit a non-safety-relevant vehicle cooperation message via the physical channel of the communication unit of the vehicle in the first period of time.

10 Claims, 2 Drawing Sheets

(56) References Cited

U.S. PATENT DOCUMENTS

| | | |
|---|---|---|
| 2005/0096825 A1 | 5/2005 | Lee |
| 2006/0149475 A1* | 7/2006 | Kellum .................. G01S 11/06 701/300 |
| 2007/0211624 A1 | 9/2007 | Schmidt et al. |
| 2010/0019891 A1* | 1/2010 | Mudalige ............... G08G 1/163 340/425.5 |
| 2010/0286864 A1* | 11/2010 | Kawauchi ............. G01S 5/0072 701/31.4 |
| 2011/0255482 A1* | 10/2011 | Holland ............ H04W 72/1221 370/329 |
| 2012/0016627 A1* | 1/2012 | Nagura ................. G08G 1/161 702/150 |
| 2012/0064820 A1 | 3/2012 | Bemmel |
| 2012/0127874 A1* | 5/2012 | Oh .................... H04W 74/0833 370/252 |
| 2012/0149389 A1* | 6/2012 | Lin ..................... H04W 74/002 455/456.1 |
| 2012/0188964 A1* | 7/2012 | Zhang ............... H04W 72/0406 370/329 |
| 2013/0012253 A1* | 1/2013 | Yamamoto ....... G08G 1/096716 455/509 |
| 2013/0120159 A1 | 5/2013 | Staehlin et al. |
| 2013/0141251 A1* | 6/2013 | Sims ...................... B60Q 9/008 340/905 |
| 2013/0176120 A1* | 7/2013 | Shibamori ............. E02F 9/267 340/438 |
| 2013/0190967 A1* | 7/2013 | Hassib .................. G06Q 10/00 701/31.5 |
| 2013/0257608 A1* | 10/2013 | Larice ..................... B60Q 9/00 340/438 |
| 2014/0092249 A1* | 4/2014 | Freiburger ............. H04N 7/181 348/148 |
| 2014/0180556 A1* | 6/2014 | Warkentin ......... G06Q 10/0639 701/99 |

FOREIGN PATENT DOCUMENTS

| | | |
|---|---|---|
| CN | 101763741 A | 6/2010 |
| CN | 101866557 A | 10/2010 |
| CN | 103119905 A | 5/2013 |
| DE | 10 2006 010 513 A1 | 9/2007 |
| DE | 10 2006 056 220 A1 | 6/2008 |
| DE | 10 2010 038 640 A1 | 2/2012 |
| EP | 1 346 881 A2 | 9/2003 |
| GB | 2483986 A | 3/2012 |
| JP | 8-79841 A | 3/1996 |
| KR | 10-2012-0058860 A | 6/2012 |
| WO | WO 03/058911 A1 | 7/2003 |

OTHER PUBLICATIONS

International Search Report (PCT/ISA/210) issued in PCT Application No. PCT/DE2014/100278 dated Jan. 30, 2015 with English translation (Four (4) pages).

German-language Written Opinion (PCT/ISA/237) issued in PCT Application No. PCT/DE2014/100278 dated Jan. 30, 2015 (Five (5) pages).

German-language Search Report issued in counterpart German Application No. 10 2013 013 621.0 dated Jul. 11, 2014 with partial English translation (Thirteen (13) pages).

English translation of Chinese Office Action issued in counterpart Chinese Application No. 201480045233.1 dated Nov. 29, 2017 (eight pages).

Yingtian, "Research on Optimization of Intelligent Transportation Wireless Vehicle Communication Protocols Based on IEEE 802. 11P/1609 Protocols", Beijing University of Posts and Telecommunications Master's Thesis, Jan. 11, 2011, pp. 1-13.

* cited by examiner

SAFETY-COMPLIANT MULTIPLE OCCUPANCY OF A CHANNEL IN INTELLIGENT TRANSPORTATION SYSTEMS

CROSS REFERENCE TO RELATED APPLICATIONS

This application is a continuation of PCT International Application No. PCT/DE2014/100278, filed Jul. 31, 2014, which claims priority under 35 U.S.C. § 119 from German Patent Application No. 10 2013 013 621.0, filed Aug. 15, 2013, the entire disclosures of which are herein expressly incorporated by reference.

BACKGROUND AND SUMMARY OF THE INVENTION

The invention relates to the technical field of "Intelligent Transportation Systems" (ITS). In particular, the invention relates to the efficient implementation of intelligent transportation systems of this type.

Communication protocols and cooperative safety applications are currently standardized within various initiatives relating to "Intelligent Transportation Systems" (ITS), among others in the European standardization bodies ETSI and CEN, and in the USA in ISO, SAE and IEEE. The aim is to enable cooperative and, wherever possible, accident-free driving for all vehicle manufacturers in the future. The cooperative safety applications also contain, inter alia, collision avoidance applications and collision mitigation applications for side-impact and rear-end collisions. The safety applications addressed and the associated transmission protocols and data formats are documented, inter alia, in the ETSI standard TS 102 637 and in the SAE standard SAE J2735. A Cooperative Awareness Message (CAM) is thus defined in the TS 102 637-2 standard. This message is transmitted at periodic intervals by an ITS station (e.g. by a vehicle) in order to provide other ITS stations (e.g. other vehicles) in the vicinity with selected information (e.g. speed, acceleration and/or position) of the transmitting ITS station. The information exchanged between the ITS stations, e.g. using CAM messages, can be used in the respective ITS stations to recognize collision risks and, where necessary, instigate suitable countermeasures (e.g. warnings).

Along with the reduction of collision risks, the intelligent transportation system ITS can also be used to provide value-added services. Examples of such value-added services are the recording and billing of toll charges, the updating of road topology data (e.g. for navigation systems), the updating of ITS certificates, etc.

The present document concerns, in particular, the technical task of an efficient provision of value-added services of this type by way of an intelligent transportation system ITS. The intention is to ensure that the safety-related functions of the intelligent transportation system ITS (i.e., in particular, the collision avoidance functions and collision mitigation functions) are not adversely affected by the provision of the value-added services.

According to one aspect, a control unit (e.g. a vehicle cooperation control unit) for a vehicle (e.g. for an automobile, a truck and/or for a motorcycle) is described. The control unit can be configured to enable V2X (vehicle-to-X) applications (also referred to as vehicle cooperation applications), wherein the X stands, for example, for another vehicle or for road infrastructure. V2X applications can also be referred to as vehicle-to-X applications.

The control unit can be configured to receive and/or transmit one or more safety-related vehicle cooperation messages via a physical channel of a communication unit of the vehicle. In particular, the control unit can be configured to administer or provide a logical control channel for receiving and/or transmitting one or more safety-related vehicle cooperation messages.

The physical channel may be a wireless transmission channel (e.g. in the 5-6 GHz range). The communication unit of the vehicle typically comprises only one physical channel for transmitting vehicle cooperation messages. In particular, the vehicle may comprise only one single physical channel for transmitting vehicle cooperation messages.

The one or more safety-related vehicle cooperation messages may include one or more "Cooperative Awareness Message" (CAM messages) of the vehicle-to-X network, one or more "Decentralized Environmental Notification Message" (DENM messages) of the vehicle-to-X network, and/or one or more "Basic Safety Message" (BSM messages).

The control unit can be configured to determine an indicator that the vehicle (also referred to as the ego vehicle) has a reduced risk of conflict with another road user (e.g. with another road user of the vehicle-to-X network) in a first time period. In particular, one or more indicators can be determined for the existence of a reduced risk of conflict with all (ITS-enabled) road users in the reception/transmission range of the ego vehicle. The control unit can be configured to determine one or more of the following indicators: an indicator of the stopping of the ego vehicle in the first time period; an indicator of the stopping of another vehicle in front and/or behind the ego vehicle in the first time period; an indicator that the ego vehicle is located in a traffic jam in the first time period; an indicator that the ego vehicle is located in front of a red traffic light in the first time period; an indicator that the ego vehicle is located in a non-public area (e.g. on a parking lot or at a filling station) in the first time period; and/or an indicator that the ego vehicle is located on a road section on which no oncoming traffic, no crossing traffic and/or no traffic merging onto the road is to be expected (e.g. on a highway or expressway). The above-mentioned indicators may represent indications that a reduced risk of conflict exists. If a plurality of the above-mentioned indicators exist, the risk of conflict can be reduced and, if possible, also entirely excluded. This means that the control unit can be configured to determine a multiplicity of indicators of the existence of a reduced risk of conflict and/or to determine a probability of a risk of conflict therefrom. A suitable combination of indicators (e.g. in specific scenarios) can produce a probability of (almost) zero.

The control unit can be configured to receive sensor data from one or more sensors of the vehicle. The sensors may, for example, be a camera, a radar, an ultrasound sensor, a GPS receiver, etc. The control unit can be configured to determine the indicator(s) of the existence of a reduced risk of conflict (also) on the basis of the received sensor data. In addition, received vehicle cooperation messages can be used to determine the one or more indicators.

The control unit can furthermore be configured to receive and/or transmit a non-safety-related vehicle cooperation message via the physical channel of the communication unit in the first time period. In particular, the control unit can be configured to administer or provide a logical control channel for receiving and/or transmitting one or more safety-related vehicle cooperation messages. The control unit is typically configured in such a way that the physical channel of the communication unit is assigned either to the logical control channel for receiving and/or transmitting one or more safety-related vehicle cooperation messages, or to the logical service channel for receiving and/or transmitting one or more non-safety-related vehicle cooperation messages (in a mutually exclusive manner). In the first time period, the physical channel of the communication unit can be assigned at least partially to the logical service channel due to the reduced risk of conflict.

In particular, the control unit can be configured to determine a probability of a risk of conflict in the first time period (on the basis of one or more indicators for the existence of a reduced risk of conflict). Furthermore, the control unit can be configured to assign the physical channel of the communication unit at least partially to the logical service channel in the first time period if the determined probability lies below a predefined probability threshold value.

The control unit can thus be configured to use the same physical channel for transmitting safety-related vehicle cooperation messages and for transmitting non-safety-related vehicle cooperation messages and to increase the safety risk to a controlled extent only (if at all). This enables a low-cost provision of value-added services (through the transmission of non-safety-related vehicle cooperation messages) in vehicle-to-X networks.

The control unit can be configured to predict a reception time period for receiving a periodic safety-related vehicle cooperation message of another ITS station (e.g. of an emergency vehicle). It can furthermore be determined that the predicted reception time period occurs in the first time period. The control unit can be configured to assign the physical channel of the communication unit to the logical control channel in the predicted reception time period in order to ensure that the periodic safety-related vehicle cooperation message of the other ITS station can be received. Furthermore, the control unit can be configured to assign the physical channel of the communication unit to the logical service channel before and/or after the reception time period (insofar as these time periods still occur in the first time period).

The control unit can be configured to transmit safety-related vehicle cooperation messages (e.g. CAM messages) via the physical channel of the communication unit. The frequency of the periodic safety-related vehicle cooperation messages may be variable. The control unit can be configured to reduce the frequency of the periodic safety-related vehicle cooperation messages in the first time period (in comparison with the frequency before and/or after the first time period). The time periods within the first time period for transmitting non-safety related vehicle cooperation messages can thereby be increased.

According to a further aspect, a method is described for transmitting vehicle cooperation messages. The method comprises the receiving and/or transmitting of at least one safety-related vehicle cooperation message via a physical channel of a communication unit of a vehicle. The method furthermore comprises the determining of at least one indicator that the vehicle has a reduced risk of conflict with at least one other road user in a first time period. If at least one indicator has been determined, at least one non-safety-related vehicle cooperation message can be received and/or transmitted via the physical channel of the communication unit of the vehicle in the first time period.

According to a further aspect, a software (SW) program is described. The SW program can be configured to be executed on a processor and as a result to carry out the method described in this document.

According to a further aspect, a storage medium is described. The storage medium may include an SW program which is configured to be executed on a processor and as a result to carry out the method described in this document.

It should be noted that the methods, devices and systems described in this document can be used both alone and also in combination with other methods, devices and systems described in this document. Furthermore, all aspects of the methods, devices and systems described in this document can be combined with one another in a variety of ways. In particular, the features of the claims can be combined with one another in a variety of ways. Other objects, advantages and novel features of the present invention will become apparent from the following detailed description of one or more preferred embodiments when considered in conjunction with the accompanying drawings.

BRIEF DESCRIPTION OF THE DRAWINGS

The invention is described in detail below with reference to example embodiments, wherein.

DETAILED DESCRIPTION OF THE DRAWINGS

As already explained above, the present document concerns, in particular, the interplay of ITS applications "Collision Mitigation" (i.e. the reduction of collision consequences) and/or "Collision Avoidance" (i.e. the prevention of collisions) and (non-safety-related) value-added services. The ITS applications are enabled on the basis of information that is exchanged between vehicles in road traffic. Within different standardization bodies (e.g. ETSI in Europe or SAE in the USA), communication protocols, such as e.g. the ETSI standard TS 102 637 and the SAE standard SAE J2735, are specified for the exchange of this information. The standardized communication protocols define message formats which enable a vehicle (i.e. a so-called ITS station or station for short) which receives information in the standardized message format to be able to interpret the received information correctly. Thus, for example, in ETSI TS 102 637-2, a CAM (Corporate Awareness Message) is defined which can be transmitted at periodic intervals (e.g. every 0.1 s or every 1 s) by an ITS station (e.g. by a vehicle). Furthermore, in ETSI TS 102 637-3, the DENM (Decentralized Environmental Notification Message) is defined which can be transmitted by an ITS station (e.g. by a vehicle) on specific occasions (e.g. when an acute risk situation exists). A transmitter/receiver of information (e.g. a vehicle or infrastructure such as e.g. a traffic light) is typically referred to as an ITS station. A group of ITS stations forms a so-called V2X (Vehicle-to-Vehicle, V2V, and/or Vehicle-to-Infrastructure, V2I) network (wherein the X stands for a vehicle and/or for infrastructure).

An ITS station can transmit a CAM message and thus inform other stations of its position, of its movement (e.g. direction, speed), of fundamental descriptive attributes (e.g.

size of the ITS station, type of the vehicle) and of selected sensor data (e.g. external temperature, status of a siren). A wide variety of ITS applications are enabled with this information, such as e.g. "Forward Collision Avoidance (FCA)" or "Red Light (Stop Sign) Violation Warning (RLV)".

Figure 1:
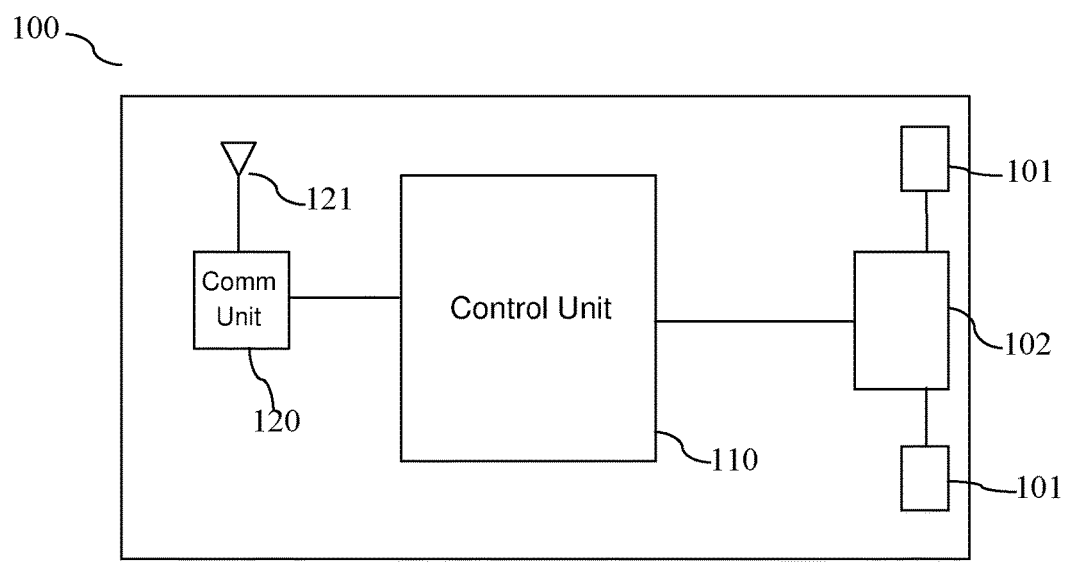
FIG. 1 is a block diagram of an example of an ITS station (in particular an example of a vehicle) which includes a control unit to provide and/or use ITS data.

FIG. 1 shows an example of an ITS station 100 (e.g. a vehicle such as, for example, an automobile or a motorcycle). The ITS station 100 includes a communication unit 120 which is configured to transmit a vehicle cooperation message via an antenna 121 into the V2X network and/or to receive a vehicle cooperation message via the antenna 121 from the V2X network. To do this, the communication unit 120 can use a suitable wireless transmission path (e.g. a Wireless Local Area Network, WLAN, connection and/or a Universal Mobile Telecommunication Network, UMTS, connection and/or a Long Term Evolution, LTE, connection). In particular, the WLAN specified for V2X communication according to the IEEE 802.11p standard can be used. Furthermore, it is provided to operate the V2X network in the 5 GHz range (see e.g. ETSI ES 202 663, ETSI TS 102 687 and ETSI TS 102 792). These networks are typically referred to as ITS G5 networks.

The vehicle cooperation message can be transmitted via the wireless transmission path directly (i.e. with no intermediate station) or indirectly (i.e. via a switching system) to one or more other ITS stations (e.g. vehicles) in the vicinity of the transmitting ITS station 100 (e.g. vehicle).

The vehicle cooperation message may be, for example, a CAM message which is transmitted with a predefined frequency (e.g. once per second up to 10 times per second) by the ITS station 100 (e.g. by the vehicle 100). Alternatively or additionally, the vehicle cooperation message may be, for example, a DENM message which is transmitted depending on a triggering event. For a V2X network which uses standards other than the ETSI standards (e.g. in the USA), the vehicle cooperation message may assume the form specified in these standards (e.g. a "Basic Safety Message" (BSM)).

The ITS station 100 includes a control unit 110 which is configured to instigate the transmission of a vehicle cooperation message and/or to evaluate a received vehicle cooperation message. Furthermore, the control unit 110 can be configured to specify the frequency of the transmitted vehicle cooperation messages.

As explained above, the main focus of a V2X network is the exchange of safety-related information between road users (by means of the exchange of vehicle cooperation messages) for the purpose of collision avoidance and collision mitigation. For this reason, it may be advantageous to reserve a dedicated physical transmit/receive channel for receiving and for transmitting safety-related vehicle cooperation messages (e.g. CAM messages). This dedicated physical transmit/receive channel can be provided by a dedicated communication unit 120. The ETSI standard specification TS 102 724 specifies, for example, that a vehicle listens uninterruptedly to the dedicated physical transmit/receive channel in order to receive safety-related vehicle cooperation messages. In other words, the aforementioned ETSI specification provides that a dedicated physical transmit/receive channel is assigned to a logical control channel via which safety-related vehicle cooperation messages are exchanged. In further other words, the ETSI standard specification TS 102 724 specifies that a vehicle should be configured to be able to listen uninterruptedly to the logical control channel. It is furthermore specified that the vehicle periodically transmits its own CAM messages and receives and/or forwards event-based DENM messages via the control channel.

As a result of the reservation described above of a communication unit 120 of the vehicle 100 for the control channel, one or more further communication units 120 and antennas 121 (also referred to as transceivers) must be provided for the provision of further service channels (for the provision of value-added services). This results in a significant increase in the costs of an ITS station 100, as a result of which the setting up of V2X networks can be hindered.

In this document, a method (as well as a control unit 110 carrying out the method) is described which enables the communication unit 120 provided for the control channel to be used for the provision of one or more service channels also. A service channel is provided without adversely affecting the safety-related ITS applications (e.g. the "Collision Mitigation" and/or the "Collision Avoidance" applications). It is thus achieved that value-added services can also be provided with only one single communication unit 120. In other words, the method described in this document and the described control unit 110 enable a cost-effective provision of one or more service channels in a V2X network.

Figure 2:
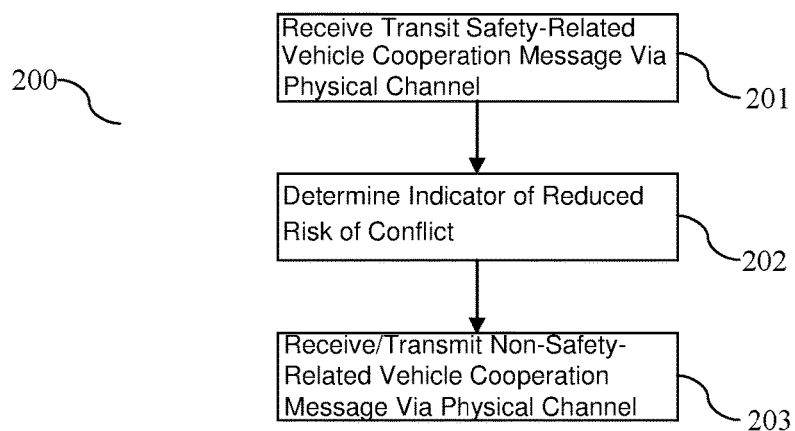
FIG. 2 is an exemplary flow chart of a method for the joint use of a physical transmission channel by a safety-related control channel and a service channel.

FIG. 2 shows a flow diagram of an example of a method 200 for transmitting vehicle cooperation messages in a V2X network (e.g. in an ITS G5 network). The method 200 includes the reception and/or transmission 201 of at least one safety-related vehicle cooperation message via a physical channel of the communication unit 120 of the vehicle 100. The safety-related vehicle cooperation messages may, in particular, be CAM messages and/or DENM messages.

The method 200 furthermore includes the determining 202 of at least one indicator that the vehicle 100 has a reduced risk of conflict with at least one other road user in a specific time period. In other words, one or more indicators can be determined which indicate that reduced safety risks exist for the vehicle 100 and/or for road users in the vicinity of the vehicle 100 in the specific time period. In further other words, indicators can be determined which indicate that a scenario exists in the specific time period wherein it can be assumed that no or reduced safety risks exist for the vehicle 100 and/or for the road users surrounding the vehicle 100. The road users surrounding the vehicle 100 may, in particular, be other ITS stations 100, i.e. road users that can transmit safety-related vehicle cooperation messages to the vehicle 100, or road users which can receive safety-related vehicle cooperation messages from the vehicle 100.

If at least one indicator has been determined which indicates that a reduced safety risk exists in the specific time period, at least one non-safety-related vehicle cooperation message can be received and/or transmitted via the physical channel of the communication unit 120 of the vehicle 100 during the specific time period (step 203). Due to the fact that a reduced safety risk exists in the specific time period, the physical channel of the communication unit 120 of the vehicle 100 (which is otherwise provided or reserved for the exchange of safety-related vehicle cooperation messages) can be used for the exchange of non-safety-related vehicle cooperation messages without excessively jeopardizing the safety of the vehicle 100 or the surrounding road users. Due to the fact that a reduced safety risk exists in the specific time period, the safety risk for the vehicle 100 and/or the surrounding road users can at least be limited. The method 200 can also be designed in such a way that a specific time period in which no safety risk exists is determined for transmitting non-safety-related vehicle cooperation messages.

By means of the method 200 shown in FIG. 2, it can be ensured that the safety of the cooperative transport system ITS is not adversely affected by a temporary changeover of the logical channel which is transmitted via the physical channel of the communication unit 120. As already explained above, the control unit 110 can be configured to carry out the method 200. In particular, the control unit 110 can be configured to recognize scenarios (i.e. situations) in which no or at least a reduced safety risk exists. These scenarios can be recognized on the basis of one or more indicators. In order to determine indicators of this type or to recognize scenarios of this type, the control unit 110 can use data which are provided by one or more sensors 101 of the vehicle 100. The sensors 101 of the vehicle 100 may, for example, be one or more cameras, one or more ultrasound sensors, a GPS receiver, etc. The data from the one or more sensors 101 can be forwarded via a sensor control device 102 to the control unit 110. Furthermore, received safety-related vehicle cooperation messages (also referred to as cooperative ITS messages) or digital map data can be used.

The control unit 110 can be configured, in particular, to meet the requirements relating to the transmission of safety-related vehicle cooperation messages (e.g. the periodic transmission of CAM or BSM messages). For example, the control unit 110 can be configured to transmit a CAM message via the physical channel of the communication unit 120 with a specific frequency (between once per second and 10 times per second). In other words, the control unit 110 can be configured to meet the "obligation" of an ITS station 100 specified in the V2X network.

Scenarios in which it is ensured that no or a reduced safety risk exists are described below. The control unit 110 can be configured to recognize the existence of one or more of these scenarios.

In particular, the control unit 110 can be configured to recognize the stopping of the vehicle 100 (e.g. in a traffic jam or at a red traffic light). In this document, the vehicle 100 with the control unit 110 is referred to as the "ego vehicle" in order to differentiate this vehicle 100 from other vehicles in the vicinity. Indicators of the stopping of the ego vehicle 100 may be: a switched off engine of the ego vehicle 100, no rotation of the wheels of the ego vehicle 100, no change in the (GPS) position of the ego vehicle 100.

If the stopping of the ego vehicle 100 is recognized, CAM/BSM messages can be transmitted periodically via the physical channel of the communication unit 120 (in order to meet the "obligation"). In addition, a temporary changeover from the logical control channel (for the exchange of safety-related vehicle cooperation messages) to a logical service channel (for the exchange of non-safety-related vehicle cooperation messages, e.g. for value-added services) is possible.

In the changeover from the logical control channel to a logical service channel, it should be ensured that safety-related vehicle cooperation messages which cause the stationary vehicle 100 to move can nevertheless be received on the control channel. For example, it is currently provided that an emergency vehicle (e.g. an ambulance) periodically transmits CAM messages in an "Emergency Vehicle Assistance" application in which adjacent ITS stations 100 are requested to move aside in order to clear the path for the approaching emergency vehicle. The control unit 110 of the stationary vehicle 100 can be configured to determine the periodicity of the CAM messages of the emergency vehicle. Furthermore, the control unit 110 can be configured to determine times at which the reception of a CAM message of the emergency vehicle is expected. The control unit 110 can then change over to the control channel at these times in order to receive the CAM message of the emergency vehicle. A buffer can be taken into account in determining the times for receiving the CAM messages in order to ensure a reliable reception of the CAM messages. In other words, the control unit 110 can be configured to leave the control channel only if the reception of a CAM message of the emergency vehicle is not expected. It suffices here to pause periodically on the control channel for the maximum interval duration of the CAM messages transmitted from the emergency vehicle (including a possible safety buffer).

As an additional optimization, the distance to other stationary ITS stations 100 (in particular other vehicles) can be taken into account. In particular, the control unit 110 can be configured to recognize that the emergency vehicle must first pass the other stationary vehicles before a movement of the ego vehicle 100 is required. For example, the control unit 110 can be configured to determine that the emergency vehicle will still require a certain time until the emergency vehicle reaches the ego vehicle 100 due to the traffic jam and the current speed of the emergency vehicle. In this time, the control unit 110 can at least partially leave the control channel. The time intervals that are used for the service channel can thereby be extended.

The control unit 110 can be configured to recognize, on the basis of the data of the one or more sensors 101 of the ego vehicle 100, whether one or more vehicles or objects are moving in the vicinity of the ego vehicle 100. If a movement is detected, the control unit 110 can change over to the control channel in order to ensure that any safety-related vehicle cooperation messages can be received.

The control unit 110 can be configured to recognize that a further ITS station 100 is located in the vicinity of the ego vehicle 100. In particular, it can be recognized that the further ITS station 100 is located in the reception range of the communication unit 120 of the ego vehicle 100. The further ITS station 100 may be a mobile station (e.g. a vehicle) or a static station (e.g. a roadside unit (RSU)). The control unit 110 can be configured to cause the further ITS station 100 to be used (instead of the ego vehicle 100) to forward DENM messages. This is advantageous particularly if the further ITS station 100 has a plurality of transceivers (i.e. a plurality of communication units) and can therefore operate service and control channels in parallel. This relates, in particular, to infrastructure components such as RSUs which can make a value-added service available on a service channel. These infrastructure components can also take on the forwarding of DENM messages. The infrastructure components can optionally also incorporate received DENM messages into the message stream on a service channel so that the ITS stations 100 connected to the infrastructure component can receive the DENM messages without having to change over to the control channel.

The control unit 110 can be configured to recognize that the ego vehicle 100 has stopped at a (red) traffic light. Indicators of a scenario of this type are, on the one hand, the realization that the ego vehicle 100 is stationary. Furthermore, it can be determined on the basis of a vehicle cooperation message (e.g. a SPaT (Signal Phase and Timing) message) that the traffic light is currently "red". In addition, it can be determined on the basis of the (GPS) position of the ego vehicle 100 and by means of digital map data that the ego vehicle 100 is located on the road in front of the aforementioned red traffic light.

In the case where the vehicle has stopped in front of a red traffic light, the control unit 110 can be configured to adjust (e.g. to reduce) the transmission frequency of CAM messages on the basis of a recognized distance to the nearest ITS-enabled vehicle 100. The time available for the service channel can thereby be increased. In particular, the control unit 110 can be configured to recognize that the nearest ITS-enabled vehicle 100 is located in the same lane behind the ego vehicle 100. This can be determined e.g. on the basis of positioning data (e.g. GPS) and on the basis of lane recognition using the vehicle sensor system 101. In this case, the control unit 110 can be configured to prevent the transmission of CAM messages. In particular, the control unit 110 can be configured in this case to change over completely to a service channel. In this case, as long as an unchanged scenario exists, e.g. until the ego vehicle 100 starts up or the vehicle immediately in front of the ego vehicle starts up (both can be determined by the vehicle sensor system 101), a complete service channel setting can be retained. Alternatively, a discretionary changeover to the control channel can be effected temporarily in order to receive the traffic light status messages (the so-called SPaT messages) communicated there. An ITS-enabled traffic light typically forwards DENM messages so that the control unit 110 does not have to take any account of event-based safety-critical messages.

The control unit 110 can be configured to recognize that the ego vehicle 100 is located in a traffic jam. An indicator of a traffic jam is e.g. the density of received CAM messages when the ego vehicle 100 is stationary. Similar to the scenario wherein the vehicle has stopped in front of a traffic light, the control unit 110 can be configured to reduce the frequency of the transmission of CAM messages if it is recognized (e.g. using the vehicle sensor system 101) that the vehicle in front and the vehicle behind the ego vehicle 100 (in the same lane) are also stationary.

The control unit 110 can be configured to recognize that the ego vehicle 100 is stationary in a non-public area (filling station, private parking lot, etc.). This can be determined e.g. using position data (GPS) and digital map information. In this case, the control unit 110 can be configured to provide only the ITS-specific obligation (e.g. the periodic transmission of the CAM messages). The emergency vehicle scenario described above is not to be expected in this case. It is therefore possible to switch over to the service channel without further safety restrictions.

The scenarios described above relate to the case where the ego vehicle 100 is stationary. Scenarios in which the ego vehicle 100 is moving, i.e. in which the ego vehicle 100 is located in normal vehicle operation, are described below.

The control unit 110 can be configured to determine a time period during which no conflict with another (ITS-enabled) road user can take place. For example, it can be determined using map information and position information that no intersections, junctions, parking facilities etc. will be reached by the ego vehicle 100 in a specific future time period. Furthermore, the distance to the nearest ITS-enabled vehicle can be determined. From this information, an uncritical time period can be determined in which a critical approach to another ITS-enabled road user under the current conditions (current or maximum speed differences, static or adaptive speed distances, e.g. in urban Stop&Go traffic) can be excluded. Worst-case assumptions concerning suddenly stopping vehicles can be made in determining the uncritical time period. The determined uncritical time period can then be used for the changeover to the service channel, i.e. for transmitting non-safety-related vehicle cooperation messages or for transmitting value-added service messages.

Uncritical time periods when the ego vehicle 100 is moving can be determined, in particular, on highways, on urban multi-lane roads with structural direction of travel separation and on national roads with structural direction of travel separation. Uncritical time periods can also be determined on national roads without structural direction of travel separation, wherein oncoming traffic and the higher speed must typically also be taken into consideration.

If an uncritical time period is determined, the logical control channel can be vacated for the uncritical time period. A re-evaluation of the situation and a verification of the uncritical time period are preferably carried out in each cycle for transmitting CAM messages or after each transmission of a DENM message.

The control unit 110 can be configured to recognize that an RSU (i.e. an infrastructure component of the V2X network) with multi-channel capability is located in the reception range of the ego vehicle 100. In this case, the control unit 110 can furthermore be configured to forego a forwarding of DENM messages since the forwarding can be performed by the RSU. This produces further time periods which can be used for the changeover to a service channel.

Figure 3A:
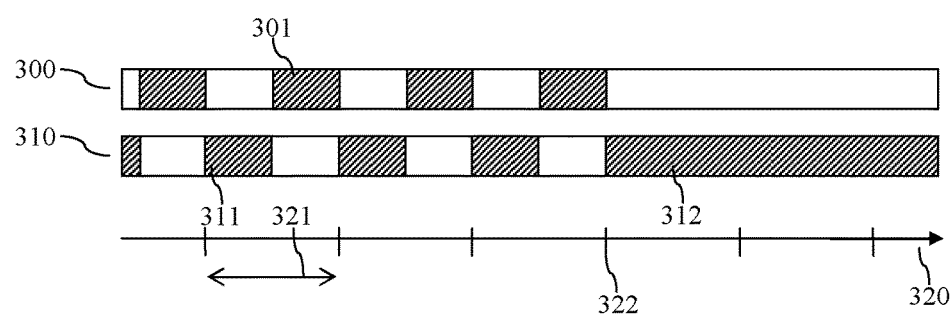
FIG. 3a and FIG. 3b are examples of patterns for the changeover between the logical service channel and the logical control channel.

FIG. 3a shows an example of a diagram of a changeover between a service channel 300 and a control channel 310. In particular, FIG. 3 shows a timeline 320 with predefined time intervals 321 (e.g. time intervals with a length of 1 s). A scenario with a reduced risk of conflict is present in the left part of the changeover diagram. In other words, it has been determined by the control unit 110 that the probability of a conflict with another ITS station 100 is relatively low. For example, it may have been determined by the control unit 110 that the ego vehicle 100 is located at a filling station. Due to the reduced risk of conflict, timeslots 301 in which non-safety-related vehicle cooperation messages can be exchanged via the physical channel of the communication unit 120 of the ego vehicle 100 can be assigned to the service channel 300 in each time interval 321. The timeslots 311 in which the ego vehicle 100 can, for example, transmit the periodic CAM messages can be assigned to the control channel 310 in each time interval 321.

In the example shown, it is determined by the control unit 110 at the time 322 that the scenario or the indicator of the reduced risk of conflict no longer exists. For example, it may have been determined that the ego vehicle 100 has left the filling station. The control unit 110 can be configured, in the absence of indicators or scenarios for a reduced risk of conflict, to assign the physical channel of the communication unit 120 of the ego vehicle 100 exclusively to the logical control channel (as shown in FIG. 3a by the timeslot 312).

Figure 3B:
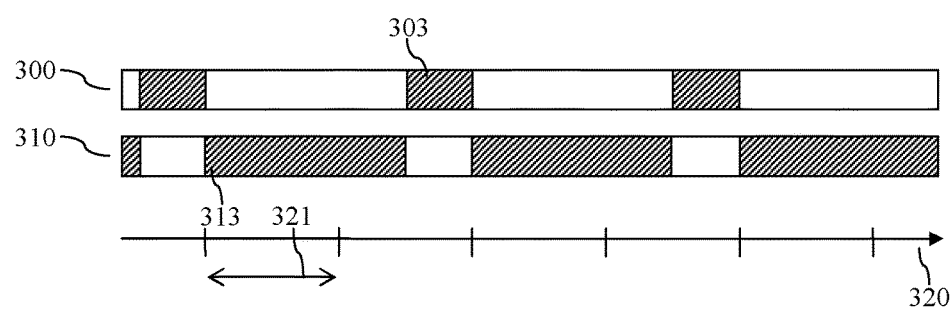

FIG. 3b shows an example in which an indicator of a reduced risk of conflict with another ITS station 100 has been determined by the control unit 110, but wherein the determined probability of a conflict is higher than in the example shown in FIG. 3a. For example, it may have been determined that the ego vehicle 100 is located at a red traffic light. Timeslots 303 can be assigned to the service channel in this case also. However, these timeslots 303 may be shorter than the timeslots 313 which are assigned to the control channel. In particular, the portion of the time which is assigned to the service channel may be smaller than in the case shown in FIG. 3a. For example, a timeslot 303 may be assigned to the service channel only in every second time interval 321.

The portion of the physical channel of the communication unit 120 which is assigned to the service channel can thus depend on the determined probability of a conflict with another ITS station 100. In other words, the portion of the physical channel which is assigned to the service channel may depend on the criticality of the determined scenario.

Examples of patterns of the changeover between the service channel (SCH) and the control channel (CCH) may take turns e.g. with a time ratio of 1:1, e.g. every 2 s; or e.g. with a time ratio of 2:1 (e.g. twice in 3 s) or e.g. with a time ratio of 1:4 (e.g. once in 5 s)). The latter examples correspond to an intermittent (i.e. irregular) changeover pattern (also referred to as a "Klau-bit resource" pattern).

The method described in this document and the described control unit enable an increase in the functions (e.g. value-added services) made available via a V2X network. These functions can be provided with no cost increase through additional parallel receiving units in the vehicle (e.g. by a dual-transceiver solution as opposed to a single-transceiver solution). In particular, a reduction in the expenditure for value-added services in ITS 5.9 GHz networks is thereby achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control unit for a vehicle, wherein the control unit is configured to:
   receive and/or transmit one or more safety-related vehicle cooperation messages via a physical channel of a communication unit of the vehicle;
   administer a logical control channel for receiving and/or transmitting the one or more safety-related vehicle cooperation messages via the physical channel;
   administer a logical service channel for receiving and/or transmitting one or more non-safety-related vehicle cooperation messages via the physical channel; and
   assign the physical channel of the communication unit either to the logical control channel for receiving and/or transmitting the one or more safety-related vehicle cooperation messages or to the logical service channel for receiving and/or transmitting the one or more non-safety-related vehicle cooperation messages,
   receive sensor data from one or more sensors of the vehicle,
   determine a probability of a risk of conflict with another road user in a first time period on the basis of at least one of the received sensor data and received safety-related vehicle cooperation messages;
   if the determined probability of the risk of conflict is below a predefined threshold value, assign the physical channel, which is otherwise reserved for the logical control channel to exchange safety-related vehicle cooperation messages, by a temporary changeover in the first time period at least partially to the logical service channel; and
   receive and/or transmit a non-safety-related vehicle cooperation message via the physical channel of the communication unit of the vehicle when the physical channel is assigned to the logical service channel.

2. The control unit according to claim 1, wherein the control unit is configured to determine one or more of the following indicators:
   an indicator of a stopping of the vehicle in the first time period;
   an indicator of a stopping of another vehicle in front and/or behind the vehicle in the first time period;
   an indicator that the vehicle is located in a traffic jam in the first time period;
   an indicator that the vehicle is located in front of a red traffic light in the first time period;
   an indicator that the vehicle is located in a non-public area in the first time period; and
   an indicator that the vehicle is located on a road section on which no oncoming traffic, no crossing traffic and/or no traffic merging onto the road is to be expected.

3. The control unit according to claim 1, wherein the control unit is configured to assign the physical channel of the communication unit at least partially to the logical service channel in the first time period.

4. The control unit according to claim 3, wherein the control unit is configured to:
   predict a reception time period for receiving a periodic safety-related vehicle cooperation message of another ITS station;
   determine that the predicted reception time period occurs in the first time period; and
   assign the physical channel of the communication unit to the logical control channel in the predicted reception time period.

5. The control unit according to claim 4, wherein the control unit is configured to:
   transmit periodic safety-related vehicle cooperation messages via the physical channel of the communication unit; and
   reduce a frequency of the periodic safety-related vehicle cooperation messages in the first time period.

6. The control unit according to claim 1, wherein the control unit is configured to:
   predict a reception time period for receiving a periodic safety-related vehicle cooperation message of another ITS station;
   determine that the predicted reception time period occurs in the first time period; and
   assign the physical channel of the communication unit to the logical control channel in the predicted reception time period.

7. The control unit according to claim 1, wherein the control unit is configured to:
   transmit periodic safety-related vehicle cooperation messages via the physical channel of the communication unit; and
   reduce a frequency of the periodic safety-related vehicle cooperation messages in the first time period.

8. The control unit according to claim 1, wherein the safety-related vehicle cooperation message is one of:
   a "Cooperative Awareness Message" of a vehicle-to-X network;
   a "Decentralized Environmental Notification Message" of the vehicle-to-X network; or
   a "Basic Safety Message".

9. The control unit according to claim 1, wherein the communication unit of the vehicle has only one physical channel for transmitting safety-related and non-safety-related vehicle cooperation messages.

10. A method for transmitting vehicle cooperation messages, the method comprising the acts of:
    receiving from and/or transmitting to a control unit at least one safety-related vehicle cooperation message via a physical channel of a communication unit of a vehicle;
    administering a logical control channel for receiving and/or transmitting the at least one safety-related vehicle cooperation messages via the physical channel;

administering a logical service channel for receiving and/or transmitting at least one non-safety-related vehicle cooperation messages via the physical channel; and assigning the physical channel of the communication unit either to the logical control channel for receiving and/or transmitting the at least one safety-related vehicle cooperation messages or to the logical service channel for receiving and/or transmitting the at least one non-safety-related vehicle cooperation messages, receiving sensor data from one or more sensors of the vehicle, determine a probability of a risk of conflict with another road user in a first time period on the basis of at least one of the received sensor data and received safety-related vehicle cooperation messages;

if the determined probability of the risk of conflict is below a predefined threshold value, assign the physical channel, which is otherwise reserved for the logical control channel to exchange safety-related vehicle cooperation messages, by a temporary changeover in the first time period at least partially to the logical service channel; and receive and/or transmit a non-safety-related vehicle cooperation message via the physical channel of the communication unit of the vehicle when the physical channel is assigned to the logical service channel.

* * * * *